July 17, 1934.  W. WEHMEYER  1,967,045

CHUCK AND PRESS ACTUATING MECHANISM

Original Filed Oct. 27, 1932  2 Sheets-Sheet 1

INVENTOR
Werner Wehmeyer

July 17, 1934. W. WEHMEYER 1,967,045
CHUCK AND PRESS ACTUATING MECHANISM
Original Filed Oct. 27, 1932  2 Sheets-Sheet 2

INVENTOR
Werner Wehmeyer

Patented July 17, 1934

1,967,045

UNITED STATES PATENT OFFICE 1,967,045

CHUCK AND PRESS ACTUATING MECHANISM

Werner Wehmeyer, Sommerda, Germany

Application October 27, 1932, Serial No. 639,856.
Renewed June 12, 1934. In Germany November 5, 1931

4 Claims. (Cl. 279—1)

My invention relates to a mechanism for operating the jaws of a chuck or other device for holding work for various purposes as for the performance of operations thereon or the ram of a press for bringing and maintaining work under a constant pressure, and an object of my invention, among others is to provide actuating means of this type that shall be simple in construction and widely adaptable to various operating conditions.

Figure 1:
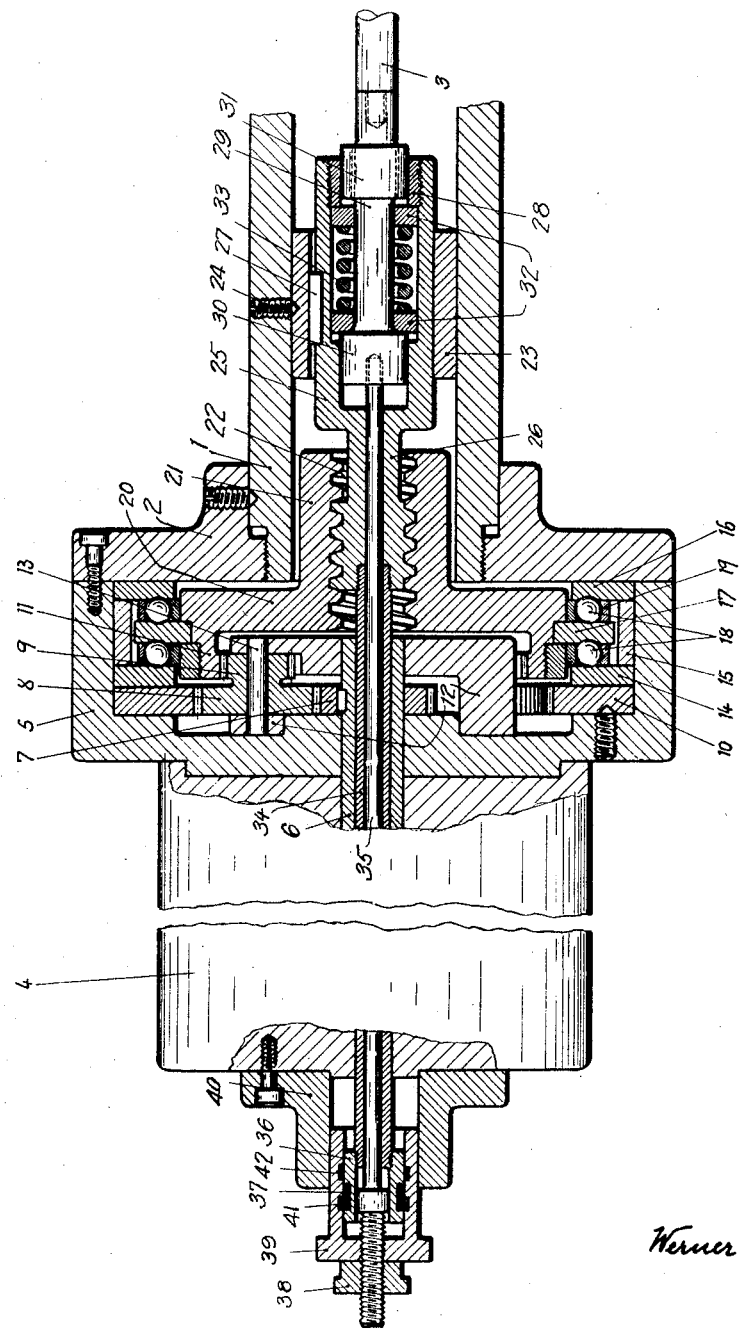
Figure 2:
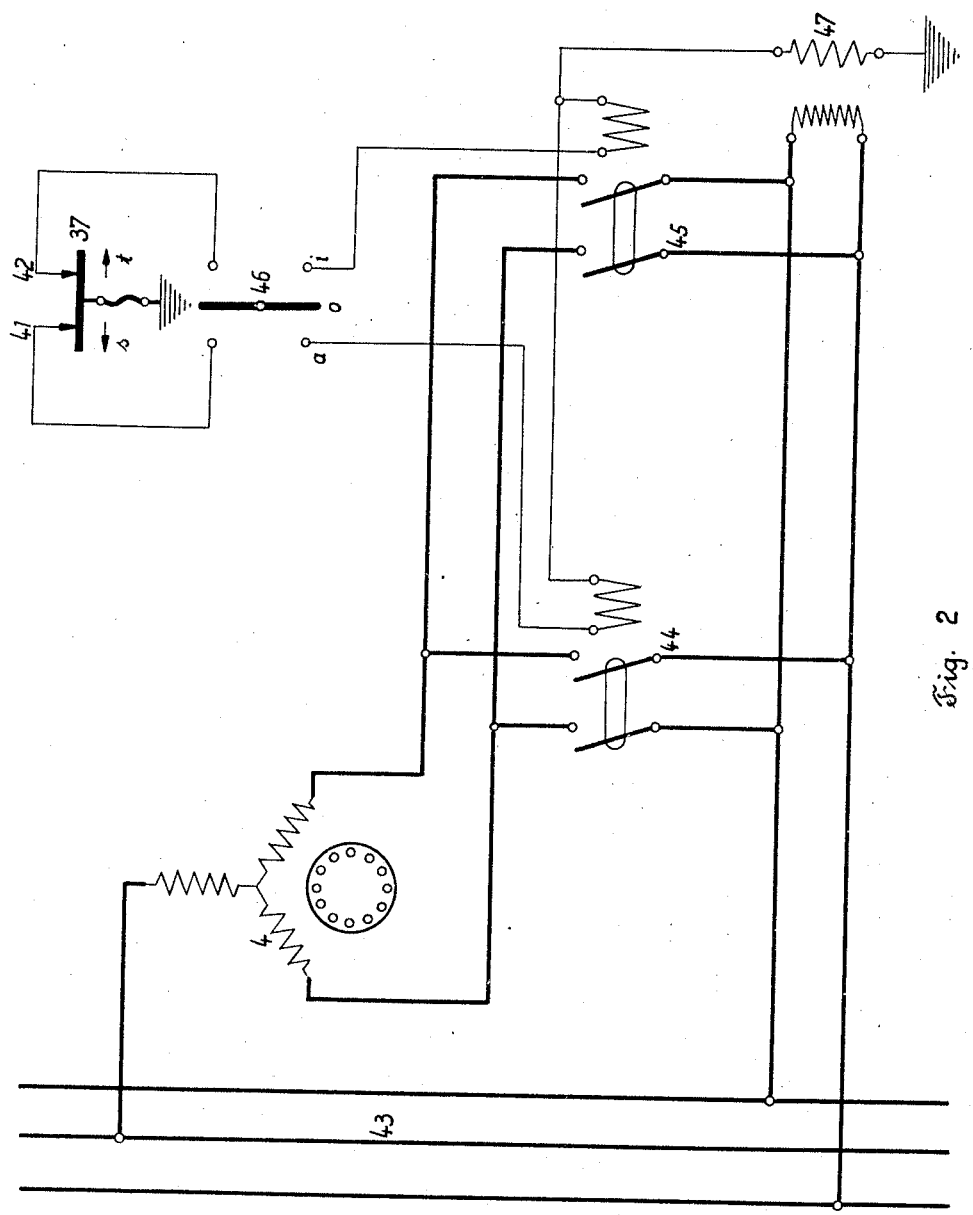

One form of a mechanism embodying my invention and in the construction and use of which the objects of my invention may be attained is illustrated in the accompanying drawings in which Fig. 1 is a longitudinal cross-section through the mechanism and Fig. 2 is a diagram of the electrical connection belonging thereto.

In the drawings the mechanism is shown as applied to the live spindle of a lathe and it is secured to the rear end of this spindle 1 by means of a suitable thread in its cover 2. At the opposite end of spindle 1 a chuck of any conventional design is mounted and this is connected with the actuating mechanism by draw bar 3 in the well-known manner.

The power necessary to operate the chuck is supplied by an electric motor 4, coaxially mounted on the gear housing 5. The motor shaft 6, which is hollow for purposes to be shown later, carries a spur gear 7, which is the driving wheel of a planetary transmission 7, 8, 9, 10, 11. The internally toothed gear 10 is the stationary base wheel, the several clusters 8—9 revolve with their cage 12, in which they are mounted on shafts 13. The cage 12 is journalled, at the left side, on an internal shoulder of housing 5 and on the right side, on an extension of the motor shaft 6. The driven gear 11, which is also toothed internally, to mesh with the teeth of gears 9, is supported axially and radially by a ball bearing, consisting of a central thrust ring 17, 2 outer thrust rings 14 and 16, a spacer 15, balls 18 and cages 19. The driven gear 11 also has a flange 20 and a hub portion 21. These portions of the driven gear have a central bore provided with a nut thread 22 and as this hub portion and thread are most essential for the function of the driven gear 11, it will in the following be referred to as the nut 21. From the foregoing it will be clear that when the shaft 6 of motor 4 rotates, it will impart a relatively slow rotation to nut 21, owing to the high transmission ratio inherent in the planetary type of gearing.

In the spindle 1 is mounted a guide bushing 23 and held in place by a lock screw 24. In this bushing is guided axially a hollow shaft 25, which has an extension 26 at its left end, carrying a bolt thread which corresponds with and engages the thread of nut 21. The shaft 25 is prevented from rotation by one or several keys 27, fitting into suitable grooves in the bore of bushing 23. If now the nut 21 is rotated by motor 4 and gearing as described before, it will impart a relatively slow but very powerful lengthwise movement to the shaft 25. As said before, shaft 25 is hollow, and its bore is closed partially by a ring plug 28. The bore in shaft 25 is stepped and the smaller diameter is identical with the hole in ring plug 28. On this smaller diameter is guided a solid shaft 29, having a head 30 and carrying a nut 31, and fitted on its righthand end with a thread, to receive the draw bar 3, which forms the connection with the chuck. Between the head 30 of the shaft 29 and the nut 31 are mounted two discs 32, slidable on the shaft 29 as well as in the bore of shaft 25. A compression spring 33 is inserted between the discs 32 and preferably this is mounted with a certain preload, corresponding, approximately, with the minimum pressure ever needed in the operation of the chuck or other tool to be actuated by the mechanism. In the not used position, the two discs 32 will be held respectively against the shoulder of the bore in shaft 25 and ring plug 28, by the pressure of spring 33.

When the mechanism is set into operation, the shaft 25 will move to the left for instance and due to the preload of spring 33, shaft 29 will follow this movement, just as if it were solidly connected with shaft 25. The movement is thus transmitted to draw bar 3 and to the chuck or other device, and it goes on until the jaws of the chuck strike the work. Since the internal resistance of the usual chucks or clamping tools is comparatively low, no appreciable pressure will be transmitted through shafts 25, 29 and draw bar 3 during this period.

As soon as the jaws strike the work, however, their movement naturally stops and pressure is built up, partially from the driving moment of the motor, partially also from the momentum of inertia of the rotating parts. This pressure is also transmitted through spring 33. The length of the spring does not change so long as the pressure transmitted is smaller than the preload, to which the spring is constantly subjected. The moment, the pressure exceeds this preload, the spring will be compressed further and a relative lateral movement of shaft 29 in shaft 25 will occur. The drawings show the mechanism in such a position. This relative lateral movement of the two shafts is utilized for a number of purposes as will now be described.

Attached to the lefthand end of shaft 25 is a tube 34 of small diameter, and this extends through the motor shaft 6 to the rear end of the mechanism. It is slidably supported in the motor shaft 6. A thin rod 35 is attached to the lefthand end of shaft 29 and led through tube 34, also to the rear end of the mechanism. The rod 35 is slidably supported in tube 34. On the lefthand end of tube 34 is mounted a cylindrical plug 36, suitably made of insulating material, which carries, on its outside a metallic contact ring 37, which is connected with the outside by means of a flexible cable and is grounded. The lefthand end of rod 35 is fitted with a fine thread, onto which are screwed a lock nut 38 and a sleeve 39, preferably consisting of an insulating material. This sleeve is guided in the bore of a flange 40 bolted to the left end cover of the electric motor 4. The sleeve 39 carries, on its inside, two contact pieces 41 and 42, which are made to slide on the outside of plug 36. The contact pieces 41 and 42 are also connected with the outside apparatus by means of flexible cables. In the case, that the entire mechanism is required to rotate, the flexible cables are connected to slip-rings, preferably mounted around flange 40 and cooperating with stationary brushes. This part of the apparatus is not shown, it being of a very well-known construction.

Since contact pieces 37 and 41 and 42 are solidly connected, respectively, with shafts 25 and 29, they will reproduce exactly the actual and the relative movements of said shafts. The sleeve 39 carrying contacts 41 and 42 is laterally adjustable by means of the above mentioned thread on rod 35, and may be locked in any position on said rod, by lock nut 38. Through this arrangement one may adjust the relative position of contacts 37 on one side and 41 and 42 on the other side such, that they come in or out of contact at any desired point of the relative stroke of shaft 29 against shaft 25.

The contacts 37, 41 and 42 form parts of an electric circuit, arranged to control the operation of motor 4. The connections of this circuit are illustrated diagrammatically by Figure 2. In this figure, 37, 41 and 42 again denote the contacts described before, s and t serve to indicate the two directions in which contact 37 may move relative to contacts 41 and 42. 43 denotes the three-phase supply network. Any other type of current can be used of course with respective modifications in the connection plan. 4 is the motor as in Figure 1. 44 and 45 are two relays, controlling motor 4, one for each direction of rotation. In the currentless position both relays 44 and 45 are kept open by springs. The relays are controlled by solenoids, connected by wiring as shown with a hand-operated change-over-switch 46, and an auxiliary transformer 47. The change-over switch 46 has three positions a, o and i, for lefthand rotation of the motor, rest, and righthand rotation. In position o (rest) both relays 44 and 45 are at rest. When the switch 46 is brought into position a, the circuit of transformer 47 is closed through the solenoid in relay 44, switch 46a contacts 42 and 37 and ground. Relay 44 is thereby closed and the motor runs in one direction, causing the chuck jaws to move until they strike the work. As described before on further movement of the motor the spring 33 will be compressed, and contact 37 will move in direction s, for instance as compared with contacts 41 and 42. This will continue until contact 37 escapes under contact 42, when the circuit of transformer 47 is interrupted, whereupon relay 44 will open and the motor will stop.

Principally the same would occur if switch 46 were brought into position i, except that all directions would be reversed.

If for any reason, the work held between the jaws of the chuck should get loose or the pressure decrease, the spring 33 will cause the jaws to follow immediately. In doing this however, the spring will elongate and this will result in contacts 37 and 42 coming together again; this will close the auxiliary circuit again and the motor will operate, compressing spring 33 until, as before, contacts 37 and 42 escape under another. To open the chuck or press, change-over switch 46 is brought into the opposite position (i), whereby relay 44 opens and relay 45 closes, thus reversing the motor and moving the chuck jaws in the opposite direction. Contrary to other types of self-locking chuck actuated mechanism, opening is easier than closing, because the pressure of spring 33 assists the motor in opening the chuck. The connection diagram has been shown in its simplest form, all refinements necessary for practical use having been omitted in order to facilitate the understanding. As has also been said before, equivalent connections can be provided for any other type of current.

It is also possible to subdivide each of contacts 41 and 42 into several independent contact pieces, mounted in sleeve 39 at different axial positions, and having independent cable connections with the outside apparatus. With the aid of a simple selecting switch one may then put into operation any one of these contacts at a time, to obtain control of the motor at various lengths of the spring and thus attain and maintain various clamping pressures on the chuck, as the work may require.

After carefully considering the foregoing description, the advantages of my invention over other mechanisms of a related nature will be clear, namely that (a) the clamping or pressing power of the mechanism can be controlled conveniently and accurately, by simply adjusting sleeve 39, or by selecting various contacts.

(b) Although a self locking member is employed (nut 21) and the motor is stopped after closing the chuck or press, the power will be maintained for any desired period, irrespective of outside influences tending to loosen the chuck or decrease the pressure.

Having thus described my invention, what I claim as new and desire to secure by Letters Patent is:

1. An actuating mechanism for work holding or pressing devices, comprising a housing, a motor secured to one end of the housing, a shaft extending from the other end of the housing, a rotatably mounted operating member for imparting reciprocating movement to said shaft, an operative connection between said operating member and said motor for operation of said operating member, an operative connection between said shaft and operating member, to effect longitudinal reciprocating movement of and to maintain constant pressure on said shaft, said connection including a self-locking arrangement, an elastic member, the length of which varies with the pressure transmitted, and electrical contacts operated by the length variations of said elastic member.

2. An actuating mechanism for work holding or pressing devices, comprising a housing, a motor secured to one end of the housing, a shaft extending from the other end of the housing, a rotatably mounted operating member having a screw threaded hole, an operative connection between said operating member and said motor for operation of the operating member, an operative connection between said shaft and operating member, said connection including an intermediate shaft having a screw threaded end, engaged with the screw threaded hole in said operating member, and a spring interposed between said shaft and said intermediate shaft, and two sets of electrical contacts, mechanically connected respectively, with said shaft and said intermediate shaft.

3. An actuating mechanism for work holding or pressing devices, comprising a housing, a motor secured to one end of the housing, a shaft extending from the other end of the housing, a rotatably mounted operating member having a screw threaded hole, an operative connection between said operating member and said motor for operation of the operating member, an operative connection between said shaft and operating member, said connection including an intermediate shaft having a screw threaded end, engaged with the screw threaded hole in said operating member, and a spring interposed between said shaft and said intermediate shaft, and two sets of electrical contacts, mechanically connected respectively, with said shaft and said intermediate shaft, said contacts cooperating with suitable electrical apparatus arranged to control the operation of said motor.

4. An actuating mechanism for work holding or pressing devices comprising a housing, a motor secured to one end of the housing, a shaft extending from the other end of the housing, a rotatably mounted operating member having a screw threaded hole, an operative connection between said operating member and said motor for operation of said operating member, an operative connection between said shaft and operating member, said connection including an intermediate shaft having a bore and a screw threaded end, engaged with the screw threaded hole in said operating member, and an elastic member interposed between said shaft and said intermediate shaft, said elastic member comprising a preloaded soft spring housed in the bore of said intermediate shaft and being so disposed between a pair of discs, that it receives compression forces by movements in both directions.

WERNER WEHMEYER.